United States Patent
Bishop, III et al.

(10) Patent No.: US 12,430,442 B2
(45) Date of Patent: Sep. 30, 2025

(54) ELECTRONIC SYSTEM FOR DYNAMICALLY PERFORMING LINKED EVALUATION TESTS TO IDENTIFY FAULTY CODE AND VULNERABILITIES IN SOFTWARE PROGRAMS BASED ON EFFICACY

(71) Applicant: BANK OF AMERICA CORPORATION, Charlotte, NC (US)

(72) Inventors: Jack Lawson Bishop, III, Evanston, IL (US); Timothy Andrew Wright, Bracknell (GB); Robert Riley Zink, Chicago, IL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 827 days.

(21) Appl. No.: 17/229,180

(22) Filed: Apr. 13, 2021

(65) Prior Publication Data
US 2022/0327218 A1   Oct. 13, 2022

(51) Int. Cl.
*G06F 21/57* (2013.01)
(52) U.S. Cl.
CPC .................................. *G06F 21/577* (2013.01)
(58) Field of Classification Search
CPC ..................................................... G06F 21/577
See application file for complete search history.

(56) References Cited

U.S. PATENT DOCUMENTS

| | | | |
|---|---|---|---|
| 6,711,127 B1 | 3/2004 | Gorman et al. | |
| 6,918,038 B1 | 7/2005 | Smith et al. | |
| 6,952,779 B1 | 10/2005 | Cohen et al. | |
| 7,013,395 B1 * | 3/2006 | Swiler | H04L 63/1433 |
| | | | 713/153 |
| 7,296,092 B2 | 11/2007 | Nguyen | |
| 7,757,293 B2 | 7/2010 | Caceres et al. | |
| 7,836,368 B2 | 11/2010 | Kapur et al. | |
| 8,527,813 B2 * | 9/2013 | Budnik | G06F 11/3688 |
| | | | 714/33 |
| 9,483,648 B2 | 11/2016 | Hebert et al. | |
| 9,619,375 B2 | 4/2017 | Avgerinos et al. | |
| 9,715,592 B2 | 7/2017 | Compagna et al. | |
| 9,894,090 B2 | 2/2018 | Hebert et al. | |
| 9,940,222 B2 | 4/2018 | Li et al. | |

(Continued)

Primary Examiner — Zachary A. Davis
(74) Attorney, Agent, or Firm — Moore & Van Allen PLLC; R.W. McCord Rayburn

(57) ABSTRACT

Systems, computer program products, and methods are described herein for dynamically performing linked security tests. The present invention may be configured to determine a fingerprint of an application, perform, in an order based on the fingerprint of the application, security test sequences on the application, parse responses of the application to the security test sequences to generate results of the security test sequences, and label, with the fingerprint, the results. The present invention may be further configured to provide, to one or more machine learning models, the labeled results to determine probabilities of applications having a same fingerprint as the fingerprint of the application failing the security test sequences, update, based on the probabilities of the applications failing the security test sequences, the order, and store, in a temporary persistent storage device and based on the updated order, the security test sequences.

20 Claims, 3 Drawing Sheets

(56) References Cited

U.S. PATENT DOCUMENTS

| | | | |
|---|---|---|---|
| 10,038,711 B1 | 7/2018 | Gorodissky et al. | |
| 10,068,095 B1 | 9/2018 | Segal et al. | |
| 10,122,750 B2 | 11/2018 | Gorodissky et al. | |
| 10,257,220 B2 | 4/2019 | Gorodissky et al. | |
| 10,382,473 B1 | 8/2019 | Ashkenazy et al. | |
| 10,534,918 B1 * | 1/2020 | Davidi | G06F 21/577 |
| 11,144,436 B1 * | 10/2021 | Bishop, III | G06F 11/3688 |
| 11,874,931 B2 * | 1/2024 | Bishop, III | G06F 11/3688 |
| 12,086,273 B2 * | 9/2024 | Bishop, III | G06N 20/00 |
| 2017/0091460 A1 * | 3/2017 | Kuhr | G06F 21/577 |
| 2018/0253558 A1 * | 9/2018 | Li | H04L 63/1433 |
| 2018/0330102 A1 | 11/2018 | Siman et al. | |
| 2019/0196950 A1 * | 6/2019 | Ranganathan | G06F 11/3676 |
| 2019/0245883 A1 | 8/2019 | Gorodissky et al. | |

\* cited by examiner

ELECTRONIC SYSTEM FOR DYNAMICALLY PERFORMING LINKED EVALUATION TESTS TO IDENTIFY FAULTY CODE AND VULNERABILITIES IN SOFTWARE PROGRAMS BASED ON EFFICACY

FIELD OF THE INVENTION

The present invention embraces an electronic system for dynamically performing linked evaluation tests to identify faulty code and vulnerabilities in software programs based on efficacy.

BACKGROUND

Security of an application-under-test may be tested by performing dynamic application-under-test security tests ("DAST") that each simulate an individual method that may be used to attempt to obtain unauthorized control of and/or access to the application-under-test, a system running the application-under-test, and/or the like and logging the response of the application-under-test to the security test. The log of application-under-test responses to DAST may be analyzed to reveal weaknesses (e.g., flaws, faults, bugs, vulnerabilities, and/or the like) of the application-under-test that may be potential security vulnerabilities.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for dynamically performing linked security tests (e.g., security test sequences) is presented. The system may include at least one non-transitory storage device and at least one processing device coupled to the at least one non-transitory storage device, where the at least one processing device is configured to determine a fingerprint of an application (e.g., an application-under-test), perform, in an order, security test sequences on the application, where the order is based on the fingerprint of the application, and where one or more of the security test sequences includes multiple security tests, and parse responses of the application to the security test sequences to generate results of the security test sequences, where the results of the security test sequences include whether the application passed or failed each security test of the security test sequences. The at least one processing device may be configured to label, with the fingerprint, the results and provide, to one or more machine learning models, the labeled results to determine probabilities of applications having a same fingerprint as the fingerprint of the application failing the security test sequences by determining, for each security test sequence, a probability of the applications failing the security test sequence. The at least one processing device may be configured to update, based on the probabilities of the applications failing the security test sequences, the order, where a first security test sequence having a highest probability of the applications failing is first in the updated order and store, in a temporary persistent storage device and based on the updated order, the security test sequences.

In some embodiments, the application may be a first application and the at least one processing device is further configured to determine whether a second application has the same fingerprint as the fingerprint of the first application and perform, in the updated order and based on determining that the second application has the same fingerprint as the fingerprint of the first application, the security tests on the second application. Additionally, or alternatively, the responses may be first responses, the results may be first results, and the at least one processing device may be further configured to parse second responses of the second application to the security test sequences to generate second results of the security test sequences, where the second results of the security test sequences include whether the second application passed or failed each security test of the security test sequences and label, with the fingerprint, the second results. In some embodiments, the at least one processing device may be further configured to provide, to the one or more machine learning models, the labeled second results to determine updated probabilities of the applications having the same fingerprint failing the security test sequences by determining, for each security test sequence, an updated probability of the applications failing the security test sequence. Additionally, or alternatively, the at least one processing device may be further configured to change, based on the updated probabilities of the applications failing the security test sequences, the updated order, where another security test sequence having a highest updated probability of the applications failing is first in the changed updated order and store, in the temporary persistent storage device and based on the changed updated order, the security test sequences.

In some embodiments, the at least one processing device may be further configured to determine temporal efficacy metrics for the security test sequences by determining, for each security test sequence, a temporal efficacy metric based on a comparison of a time period taken to perform the security test sequence and a number of times the applications, on which the security test sequence is performed, fail the security test sequence. Additionally, or alternatively, the at least one processing device may be further configured to change, based on the temporal efficacy metrics, the updated order.

In some embodiments, the order may be based on previously determined probabilities of the applications having the same fingerprint as the fingerprint of the application failing the security test sequences.

In some embodiments, the temporary persistent storage device may be a first temporary persistent storage device, and the at least one processing device may be further configured to store, in a second temporary persistent storage device, the results and, when labeling, with the fingerprint, the results, label the results with the fingerprint in the second temporary persistent storage device. Additionally, or alternatively, the second temporary persistent storage device may include other labeled results of security tests and security test sequences performed on one or more other applications, and the other parsed results may be labeled with one or more other fingerprints of the one or more other applications.

In some embodiments, the at least one processing device may be further configured to label, with the fingerprint, the probabilities and store, in the temporary persistent storage device, the labeled probabilities.

In some embodiments, the security test sequences may include one or more security test sequences generated by linking a first security test to a second security test that another application failed.

In some embodiments, the labeled results may include the fingerprint, whether the application passed or failed each security test performed on the application, a type of each security test performed on the application, and another order in which, within each security test sequence, the security tests were performed on the application.

In another aspect, a computer program product for dynamically performing linked security tests (e.g., security test sequences) is presented. The computer program product may include a non-transitory computer-readable medium including code causing a first apparatus to determine a fingerprint of an application (e.g., an application-under-test), perform, in an order, security test sequences on the application, where the order is based on the fingerprint of the application, and where one or more of the security test sequences includes multiple security tests, and parse responses of the application to the security test sequences to generate results of the security test sequences, where the results of the security test sequences include whether the application passed or failed each security test of the security test sequences. The computer program product may include a non-transitory computer-readable medium including code causing the first apparatus to label, with the fingerprint, the results and provide, to one or more machine learning models, the labeled results to determine probabilities of applications having a same fingerprint as the fingerprint of the application failing the security test sequences by determining, for each security test sequence, a probability of the applications failing the security test sequence. The computer program product may include a non-transitory computer-readable medium including code causing the first apparatus to update, based on the probabilities of the applications failing the security test sequences, the order, where a first security test sequence having a highest probability of the applications failing is first in the updated order and store, in a temporary persistent storage device and based on the updated order, the security test sequences.

In some embodiments, the application may be a first application, and the non-transitory computer-readable medium may include code causing the first apparatus to determine whether a second application has the same fingerprint as the fingerprint of the first application and perform, in the updated order and based on determining that the second application has the same fingerprint as the fingerprint of the first application, the security tests on the second application. Additionally, or alternatively, the non-transitory computer-readable medium may include code causing the first apparatus to parse second responses of the second application to the security test sequences to generate second results of the security test sequences, where the second results of the security test sequences include whether the second application passed or failed each security test of the security test sequences and label, with the fingerprint, the second results. In some embodiments, the non-transitory computer-readable medium may include code causing the first apparatus to provide, to the one or more machine learning models, the labeled second results to determine updated probabilities of the applications having the same fingerprint failing the security test sequences by determining, for each security test sequence, an updated probability of the applications failing the security test sequence. Additionally, or alternatively, the non-transitory computer-readable medium may include code causing the first apparatus to change, based on the updated probabilities of the applications failing the security test sequences, the updated order, where another security test sequence having a highest updated probability of the applications failing is first in the changed updated order and store, in the temporary persistent storage device and based on the changed updated order, the security test sequences.

In some embodiments, the non-transitory computer-readable medium may include code causing the first apparatus to determine temporal efficacy metrics for the security test sequences by determining, for each security test sequence, a temporal efficacy metric based on a comparison of a time period taken to perform the security test sequence and a number of times the applications, on which the security test sequence is performed, fail the security test sequence. Additionally, or alternatively, the non-transitory computer-readable medium may include code causing the first apparatus to change, based on the temporal efficacy metrics, the updated order.

In some embodiments, the order may be based on previously determined probabilities of the applications having the same fingerprint as the fingerprint of the application failing the security test sequences.

In some embodiments, the temporary persistent storage device may be a first temporary persistent storage device, and the non-transitory computer-readable medium may include code causing the first apparatus to store, in a second temporary persistent storage device, the results and when labeling, with the fingerprint, the results, label the results with the fingerprint in the second temporary persistent storage device. Additionally, or alternatively, the second temporary persistent storage device may include other labeled results of security tests and security test sequences performed on one or more other applications, where the other parsed results are labeled with one or more other fingerprints of the one or more other applications In yet another aspect, a method for dynamically performing linked security tests (e.g., security test sequences) is presented. The method may include determining a fingerprint of an application, performing, in an order, security test sequences on the application, where the order is based on the fingerprint of the application, and where one or more of the security test sequences includes multiple security tests, and parsing responses of the application to the security test sequences to generate results of the security test sequences, where the results of the security test sequences include whether the application passed or failed each security test of the security test sequences. The method may include labeling, with the fingerprint, the results and providing, to one or more machine learning models, the labeled results to determine probabilities of applications having a same fingerprint as the fingerprint of the application failing the security test sequences by determining, for each security test sequence, a probability of the applications failing the security test sequence. The method may include updating, based on the probabilities of the applications failing the security test sequences, the order, where a first security test sequence having a highest probability of the applications failing is first in the updated order and storing, in a temporary persistent storage device and based on the updated order, the security test sequences.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
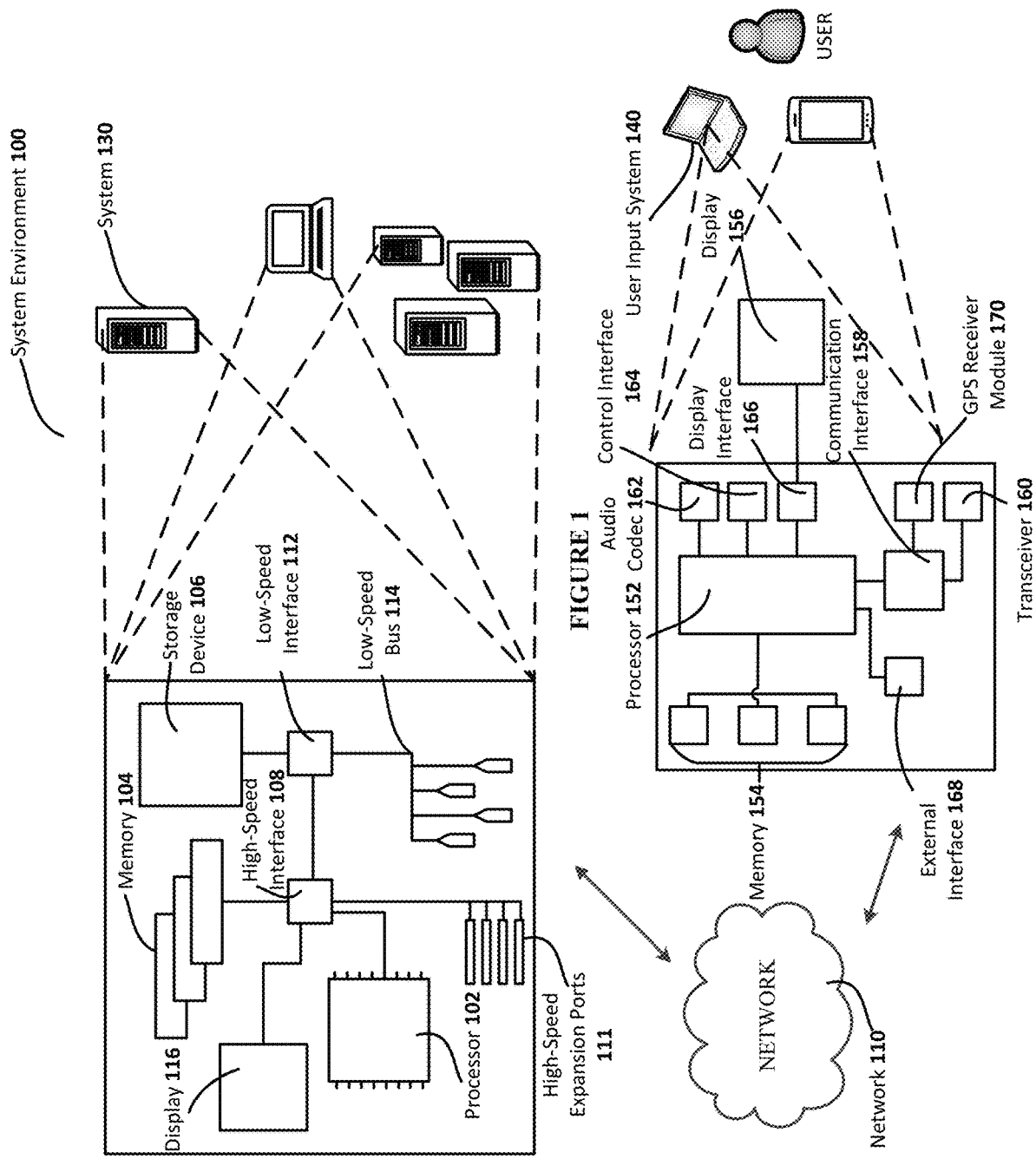
Figure 2:
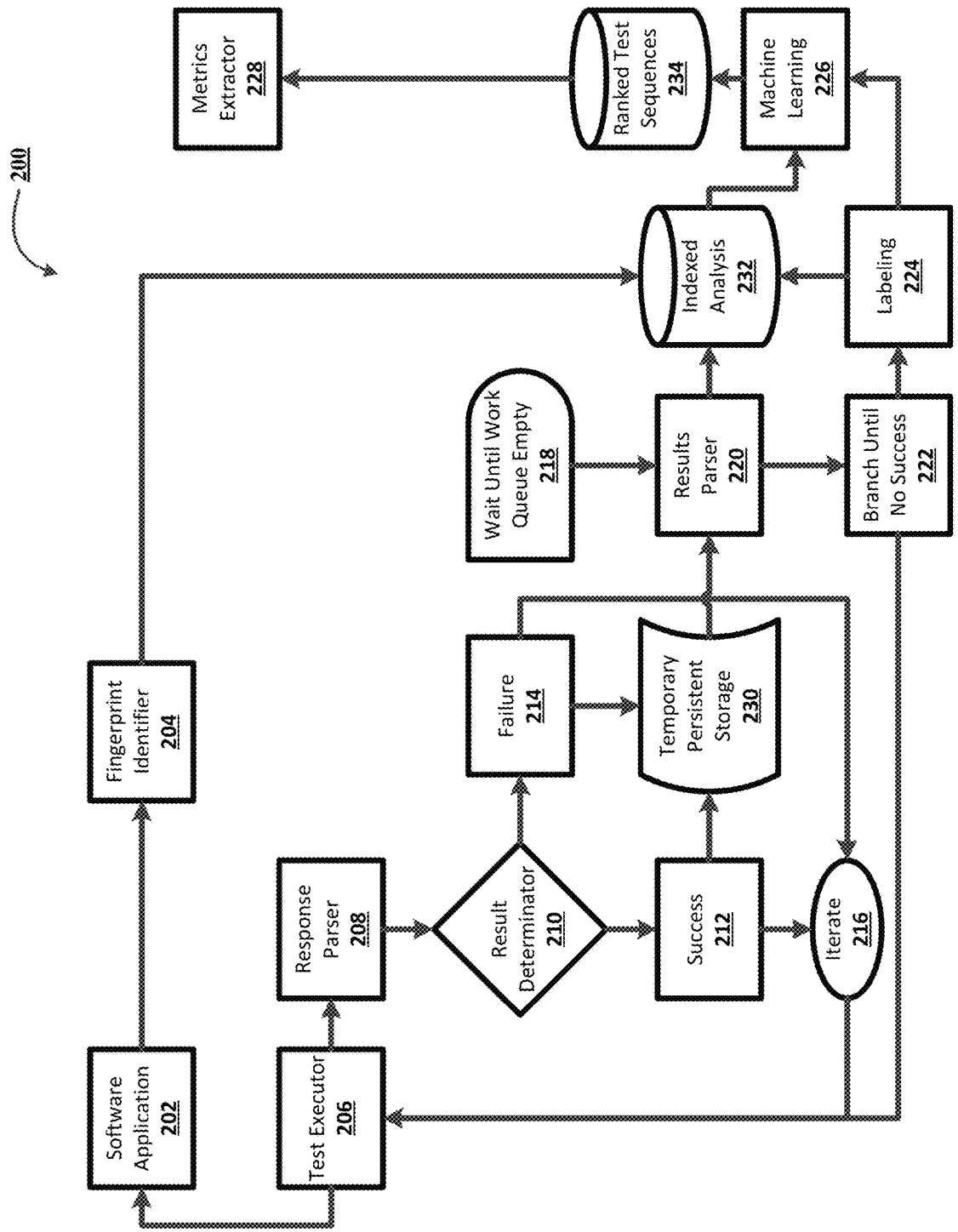
Figure 3:
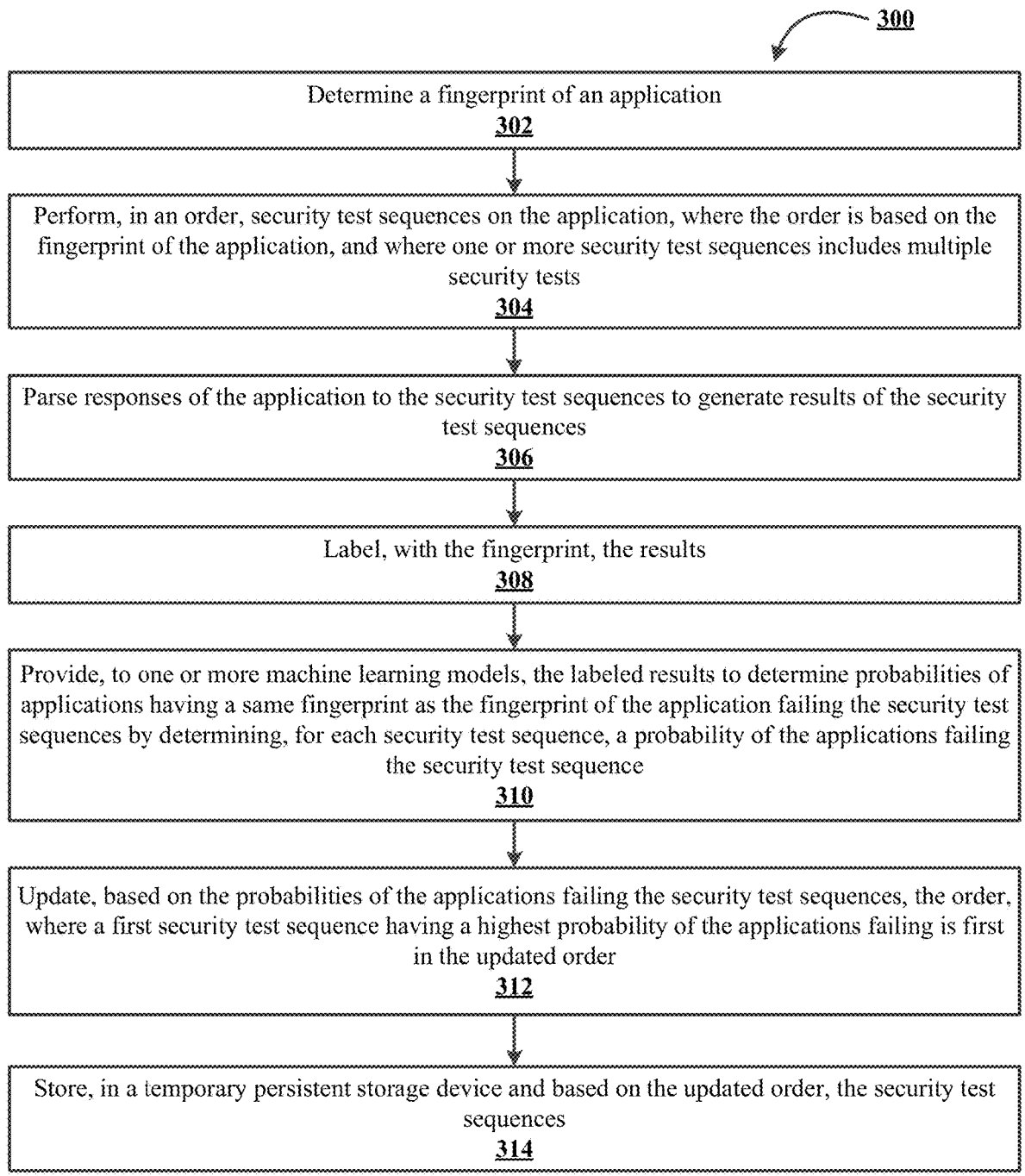

Having thus described embodiments of the invention in general terms, reference will now be made the accompanying drawings, wherein:

FIG. 1 illustrates technical components of a system for dynamically performing linked security tests, in accordance with an embodiment of the invention;

FIG. 2 illustrates a process flow for dynamically performing linked security tests, in accordance with an embodiment of the invention; and FIG. 3 illustrates a process flow for dynamically performing linked security tests, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, security of an application-under-test may be tested by performing DAST in which each security test (e.g., evaluation test) simulates a method that may be used to attempt to obtain unauthorized control of and/or access to the application-under-test, a system running the application-under-test, and/or the like and logging the response of the application-under-test to the security test. The log of responses to DAST may be analyzed to reveal weaknesses (e.g., flaws, faults, bugs, vulnerabilities, and/or the like) of the application-under-test that may be potential security vulnerabilities. The weaknesses may be categorized using a category system, such as the Common Weakness Enumeration (CWE), and steps may be taken to address the weaknesses of the application. However, because each security test is run individually (e.g., in isolation from other tests), the security tests fail to test logic within the application-under-test and fail to simulate human-driven attempts to obtain unauthorized control of and/or access to the application-under-test, a system running the application-under-test, and/or the like. Furthermore, even running a large number of different security tests in an automated manner fails to accurately simulate unauthorized attempts to obtain unauthorized control of and/or access to the application-under-test, a system running the application-under-test, and/or the like that may occur after the application-under-test is deployed. To test logic within an application-under-test and simulate human-driven attempts to obtain unauthorized control and/or access, a database of linked security tests (e.g., security test sequences) may be created and/or maintained by performing security tests on the application-under-test to generate training data for a machine learning model to generate linked security tests. The linked security tests may then be performed on other applications in a post-production environment. Over time, however, differences between the training data and applications tested in the post-production environment will reduce the efficacy of the linked security tests. Such reduced efficacy leads to lower quality and inefficient security testing, which consumes significant resources (e.g., financial resources, computing resources, network resources, and/or the like).

Some embodiments described herein provide a system, a computer program product, and/or a method for dynamically performing linked security tests. For example, a system (e.g., an electronic system for dynamically performing linked evaluation tests to identify faulty code and vulnerabilities in software programs based on efficacy and/or the like) may be configured to determine a fingerprint of an application and perform, in an order, security test sequences (e.g., linked evaluation tests, linked evaluation tools, linked security tests, and/or the like) on the application, where the order is based on the fingerprint of the application, and where one or more of the security test sequences (e.g., each security test sequence and/or the like) includes multiple security tests. The system may be further configured to parse responses of the application to the security test sequences to generate results of the security test sequences, label the results with the fingerprint, and provide the labeled results to one or more machine learning models to determine probabilities of applications having a same fingerprint as the fingerprint of the application failing the security test sequences. The system may be further configured to update, based on the probabilities of the applications failing the security test sequences, the order for performing the security test sequences. In some embodiments, the system may (e.g., rather than or in addition to storing the security test sequences in an order and updating the order) associate each of the security test sequences with an index and update the index, where the index indicates an order for performing the security test sequences on an application, and where the index is associated with a fingerprint.

In some embodiments, the system may be further configured to determine temporal efficacy metrics for the security test sequences and change the order for performing the security test sequences based on the temporal efficacy metrics. Additionally, or alternatively, the system may be further configured to determine whether a second application has the same fingerprint as the fingerprint of the first application and perform, in the updated order and based on determining that the second application has the same fingerprint as the fingerprint of the first application, the security tests on the second application. In some embodiments, the system may be further configured to parse responses of the second application to the security test sequences to generate additional results of the security test sequences, label the additional results with the fingerprint, and provide the labeled results to the one or more machine learning models to determine probabilities of applications having the same fingerprint failing the security test sequences.

By providing labeled results based on parsed responses of applications to security test sequences to the machine learning model to determine probabilities of applications having the same fingerprint failing the security test sequences and updating the order for performing the security test sequences, the system may continuously improve the machine learning model and the order for performing the security test sequences based on post-production data (e.g., data from applications tested in the post-production environment), which conserves significant resources (e.g., financial resources, computing resources, network resources, and/or the like), and improves quality and efficiency of security testing. Additionally, or alternatively, the system may advance the machine learning using a feedback loop (e.g., of post-production data including test results and/or the like). In some embodiments, the system may use machine learning to maintain results-based efficacy of the order in which security test sequences are performed as post-production applications differ over time from pre-production applications used to initially determine the order. Additionally, or alternatively, the system may analyze how long it takes to perform security test sequences and how often applications fail the security test sequences to maintain temporal-based efficacy of the order in which the security test sequences are performed.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to security tests, security test sequences, objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution and/or an allocation of resources using a resource distribution instrument (e.g., credit cards, debit cards, checks, digital wallets, currency, loyalty points, and/or the like) and/or resource distribution credentials (e.g., account numbers, resource distribution instrument identifiers, and/or the like). A resource distribution and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes, and/or the like); sending remittances; loading money onto stored value cards (SVCs) and/or prepaid cards; donating to charities; and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In some embodiments, a resource distribution and/or an allocation of resources may refer to financial transactions involving direct or indirect movement of funds through traditional paper transaction processing systems (e.g., paper check processing) or through electronic transaction processing systems. In this regard, resource distributions and/or allocations of resources may refer to the user initiating a purchase for a product, service, or the like from a merchant. Typical financial resource distribution and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

FIG. 1 presents an exemplary block diagram of a system environment 100 for dynamically performing linked security tests within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, analyze the results of, and/or the like security testing of one or more applications stored thereon. The one or more applications may be configured to communicate with the system 130, execute security tests, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for dynamically performing linked security tests, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multiprocessor system, and/or the like). In some embodiments, the system 130 may be managed by an entity, such as a business, a merchant, a financial institution, a card management institution, an software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more user input systems and/or one or more application testing systems (e.g., similar to the system 130 and/or the user input system 140) associated with an entity (e.g., a business, a merchant, a financial institution, a card management institution, an software and/or hardware development company, a software and/or hardware testing company, and/or the like). For example, a user (e.g., an employee, a customer, and/or the like) may use a user input system (e.g., similar to the user input system 140) to initiate testing of an application by an application testing system (e.g., similar to the system 130). In some embodiments, the user input system and/or the application testing system associated with the entity may perform one or more of the steps described herein with respect to the process flow described herein with respect to FIGS. 2 and/or 3.

FIG. 2 illustrates a process flow 200 for dynamically performing linked security tests within a technical environment, in accordance with an embodiment of the invention. In some embodiments, a testing system, a test sequence generating system, and/or the like (e.g., similar to one or more of the systems described herein with respect to FIG. 1) may perform one or more of the steps of process flow 200.

As shown in FIG. 2, the process flow 200 may include a software application 202 (e.g., an application-under test), a fingerprint identifier 204, a test executor 206 (e.g., a testing system and/or the like), a response parser 208, a result determinator 210, a success process 212, a failure process 214, an iteration step 216, a delay function 218, a results parser 220, a branch function 222, a labeling function 224, machine learning 226, a metrics extractor 228, a temporary persistent storage 230, an indexed analysis data structure 232, and a ranked test sequences data structure 234.

In some embodiments, the process flow 200 may include deploying the software application 202. For example, the software application 202 may be a web application. As shown in FIG. 2, the process flow 200 may include determining, with a fingerprint identifier 204, a fingerprint of the software application 202 and/or storing the fingerprint of the software application 202 in the temporary persistent storage 230, the indexed analysis data structure 234, and/or the like. For example, a system may determine the fingerprint of the software application 202 by using a hashing algorithm (e.g., an MD5 hashing algorithm) on a client-side page, a landing page, and/or the like for the software application 202 inclusive of a bill of material content referenced by the client-side page, the landing page, and/or the like. In some embodiments, the fingerprint may be globally unique identifier (GUID), a security fingerprint associated with an architecture and/or security vulnerabilities of the software application 202, and/or the like.

In some embodiments, the process flow 200 may include a work queue being populated (e.g., by an extractor and/or the like) with security tests (e.g., baseline tranche security test cases) and/or security test sequences (e.g., from the ranked test sequences data structure 234). The process flow 200 may include the test executor 206 receiving data and/or information from the work queue, obtaining test protocols from a test protocols data structure, and/or invoking traffic to perform security testing, based on the test protocols, on the software application 202. For example, the process flow 200 may include the test executor 206 performing a security test and/or security test sequences on the software application 202 based on the test protocols from the test protocols data structure and based on the data and/or information from the work queue. In some embodiments, the test executor 206 may determine the fingerprint of the software application 202 (e.g., in a manner similar to that described above).

As shown in FIG. 2, the process flow 200 may include the response parser 208 receiving response results from the software application 202 triggered by the security testing performed, by the test executor 206, on the software application 202. For example, when the test executor 206 performs a security test on the software application 202 (e.g., based on one or more test protocols), the software application 202 may generate a response to the security test, and the response parser 208 may receive the response and parse the response.

In some embodiments, the process flow 200 may include determining whether the response from the software application 202 is valid. For example, the process flow 200 may include taking further actions with respect to the response (e.g., storing the response, processing the response, labeling the response, and/or the like) based on determining that the response from the software application 202 is valid. Additionally, or alternatively, the process flow 200 may include not taking further actions with respect to the response based on determining that the response from the software application 202 is invalid and/or providing a notification to the work queue to repeat the security test, test protocol, and/or security test sequence that triggered the invalid response from the software application 202.

As shown in FIG. 2, the process flow may include the result determinator 210 receiving the parsed response from the response parser 208 and determining, based on the parsed response, whether the application passed the test or failed the test. For example, the result determinator 210 may analyze the parsed response to determine whether the response generated by the software application 202 includes data, information, and/or the like that may be used to attempt to obtain unauthorized control of and/or access to the software application 202, a system executing the software application 202, a data structure associated with the software application 202, and/or the like.

In some embodiments, if a security test performed by the test executor 206 on the software application 202 causes the software application 202 to generate a response that provides data, information, and/or the like that may be used to attempt to obtain unauthorized control of and/or access to the software application 202, a system executing the software application 202, a data structure associated with the software application 202, and/or the like, the result determinator 210 may send the response to the success process 212 (e.g., because the security test successfully identified a vulnerability in the software application 202). Additionally, or alternatively, if a security test performed by the test executor 206 on the software application 202 causes the software application 202 to generate a response that does not provide data, information, and/or the like that may be used to attempt to obtain unauthorized control of and/or access to the software application 202, a system executing the software application 202, a data structure associated with the software application 202, and/or the like, the result determinator 210 may send the response to the failure process 214 (e.g., because the security test failed to identify a vulnerability in the software application 202).

As shown in FIG. 2, the process flow 200 may include processing the parsed response via the success process 212. In some embodiments, the success process 212 may include storing the parsed response in the temporary persistent storage 230, increasing, in the temporary persistent storage 230, an index of probability of an application failing the security test that generated the parsed response, storing the fingerprint of the software application 202 in the temporary persistent storage 230, storing, in the temporary persistent storage 230, data associated with the parsed response (e.g., data generated by the software application 202 in response to the security test), and/or the like. For example, a system may store, in the temporary persistent storage 230, a test result that includes the type of security test (e.g., a CWE weakness ID associated with the security test and/or the like), the fingerprint of the software application 202, that the software application 202 failed the test, data associated with the parsed response, and/or the like.

As shown in FIG. 2, the process flow 200 may include processing the parsed response via the failure process 214. In some embodiments, the failure process 214 may include storing the parsed response in the temporary persistent storage 230, decreasing, in the temporary persistent storage 230, an index of probability of an application failing the security test that generated the parsed response, storing the fingerprint of the software application 202 in the temporary persistent storage 230, and/or the like. For example, a system may store in the temporary persistent storage 230 a test result that includes the type of security test (e.g., a CWE weakness ID associated with the security test and/or the like), the fingerprint of the software application 202, that the software application 202 passed the test, and/or the like.

As shown in FIG. 2, the process flow 200 may include, after completing the success process 212 and/or the failure process 214, performing the iteration step 216. In some embodiments, the iteration step 216 commands the test executor to request data, test protocols, and/or the like from the work queue to perform the next security test and/or security test sequence on the software application 202. Additionally, or alternatively, the process flow 200 may include iteratively performing security tests and/or security test sequences on the software application 202 with the test executor 206, parsing responses of the software application 202 with the response parser 208, determining results of the security test using the result determinator, processing the parsed response via the success process 212 and/or the failure process 214, storing results in the temporary persistent storage 230, and/or the like until the work queue is empty.

As shown in FIG. 2, the process flow 200 may include the delay function 218. In some embodiments, the delay function 218 may control one or more other processes and/or functions in the process flow 200 such that the one or more other processes and/or functions cannot begin and/or execute until an event occurs in the process flow 200. For example, and as shown in FIG. 2, the delay function 218 may control the results parser 220 to force the results parser 220 to wait until the work queue is empty before initiating.

As also shown in FIG. 2, the process flow 200 may include the results parser 220 parsing the test results stored in the temporary persistent storage 230. In some embodiments, the process flow 200 may include the results parser 220 storing the test results in the indexed analysis data structure 232. For example, the results parser 220 may parse the test results stored in the temporary persistent storage 230 to determine, based on the test results and for each security test, an index of probability of an application failing the security test and store the determined indices with the test results in the indexed analysis data structure 232.

As shown in FIG. 2, the process flow 200 may include the branch function 222 providing security test sequences to the test executor 206. In some embodiments, the process flow 200 may include iteratively performing security test sequences on the software application 202 with the test executor 206, parsing responses of the software application 202 with the response parser 208, determining results of the linked security tests using the result determinator 210, processing the parsed response via the success process 212 and/or the failure process 214, storing results in the temporary persistent storage 230, parsing the test results stored in the temporary persistent storage 230 with the results parser 220, and providing security test sequences to the test executor 206 for performance on the software application 202, and/or the like until the application passes each security test sequence. For example, the process flow 200 may include stopping the branch function 222 based on the application passing each security test sequence since the branch function 222 had last been executed.

As shown in FIG. 2, the process flow 200 may include labeling, with the labeling function 224, the test results from the success process 212 (e.g., the test results for which the software application 202 failed a security test, linked security tests, and/or the like). For example, the process flow 200 may include labeling, with the labeling function 224, the test results from the success process 212 with the fingerprint of the software application 202.

In some embodiments, and as shown in FIG. 2, the process flow 200 may include labeling, with the labeling function 224, the test results from the success process 212 in the indexed analysis data structure 232. Additionally, or alternatively, and as also shown in FIG. 2, the process flow 200 may include labeling, with the labeling function 224, the test results from the success process 212 and providing the labeled test results to the machine learning 226.

As shown in FIG. 2, the process flow 200 may include analyzing, using the machine learning 226 (e.g., a clustering machine learning algorithm, a genetic machine learning algorithm, and/or the like), the test results from the success process 212 (e.g., the labeled test results from the labeling function 224, the test results in the indexed analysis data structure 232, and/or the like). In some embodiments, the process flow 200 may include analyzing, using the machine learning 226, the test results from the success process 212 to increase a probability of a software application (e.g., the software application 202, another software application, and/or the like) failing a security test sequence. Additionally, or alternatively, the process flow 200 may include analyzing, using the machine learning 226, the test results to generate additional security test sequences (e.g., by linking security tests, by linking security tests and previously generated security test sequences, by linking previously generated security test sequences, and/or the like). In some embodiments, the process flow 200 may include analyzing, using the machine learning 226, the test results to determine probabilities of software applications having a same fingerprint as the fingerprint of the software application 202 failing the security test sequences.

As shown in FIG. 2, the process flow 200 may include storing, in the ranked test sequences data structure 234, security test sequences corresponding to test results analyzed using the machine learning 226. In some embodiments, the process flow 200 may include storing, in the ranked test sequences data structure 234, security test sequences in an order based on probabilities of software applications having the same fingerprint as the fingerprint of the software application 202 failing the security test sequences. Additionally, or alternatively, the security test sequences stored in the ranked test sequences data structure 234 may be labelled, tagged, and/or the like with the fingerprint of the software application on which the security test sequences were performed (e.g., the software application 202, another software application, and/or the like). In some embodiments, the process flow 200 may include grouping, using the machine learning 226 and in the ranked test sequences data structure 234, the security test sequences.

As shown in FIG. 2, the process flow 200 may include analyzing the security test sequences in the ranked test sequences data structure 234 and/or the labeled test results in the indexed analysis data structure 232 using the metrics extractor 228. For example, the process flow 200 may include determining, with the metrics extractor 228, temporal efficacy metrics for the security test sequences by determining, for each security test sequence, a temporal efficacy metric based on a comparison of a time period taken to perform the security test sequence and a number of times the applications, on which the security test sequence is performed, fail the security test sequence. Furthermore, the process flow 200 may include changing, based on the temporal efficacy metrics, the order in which the security test sequences are stored in the ranked test sequences data structure 234.

In some embodiments, the process flow 200 may include repeating previously described steps of the process flow 200 using the security test sequences in the ranked test sequences data structure 234. For example, the process flow 200 may include performing, with the test executor 206, the security test sequences in the order in which the security test sequences are stored in the ranked test sequences data structure 234 on another software application having the same fingerprint as the software application 202. In such an example, the process flow 200 may include determining (e.g., using the fingerprint identifier 204) a fingerprint of the other software application, determining whether the fingerprint of the other software application is the same as the fingerprint of the software application 202, and performing, based on determining that the other software application has the same fingerprint as the software application 202, the security test sequences in the order in which the security test sequences are stored in the ranked test sequences data structure 234 on the other software application. Furthermore, the process flow 200 may include parsing (e.g., using the response parser 208) responses of the other software application to generate results, parsing the results (e.g., using the results parser 220), labeling the results with the fingerprint (e.g., using the labeling function 224), and providing the labeled results to the indexed analysis data structure 232 and/or the machine learning 226.

Additionally, or alternatively, the process flow 200 may be repeated on a plurality of software applications having different fingerprints such that the indexed analysis data structure 232 includes test results labeled with the different fingerprints and the machine learning 226 may be trained to probabilistically rank security test sequences based on the different fingerprints. In this way, the system may update and/or improve the machine learning 226 and/or the ranked test sequences data structure 234 using post-production data as the system performs security testing on software applications having different fingerprints. Furthermore, the system may determine a fingerprint of a software application to be tested and perform security test sequences from the ranked test sequences data structure 234 based on the fingerprint of the software application and in an order determined by the system such that security test sequences having a highest results-based efficacy and/or temporal efficacy are performed first.

Process flow 200 may include additional embodiments, such as any single embodiment or any combination of embodiments described below and/or in connection with one or more other processes described elsewhere herein. Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 3 illustrates a process flow 300 for dynamically performing linked security tests within a technical environment, in accordance with an embodiment of the invention. In some embodiments, a testing system, a test sequence generating system, and/or the like (e.g., similar to one or more of the systems described herein with respect to FIG. 1) may perform one or more of the steps of process flow 300.

As shown in block 302, the process flow 300 may include determining a fingerprint of an application (e.g., a software application). For example, a testing system and/or a test sequence generating system may perform security tests on an application (e.g., an application-under-test).

As shown in block 304, the process flow 300 may include performing, in an order, security test sequences on the application, where the order is based on the fingerprint of the application, and where one or more of the security test sequences includes multiple security tests. For example, a testing system and/or a test sequence generating system may perform, in an order, security test sequences on the application. In some embodiments, the order may be based on the fingerprint of the application. Additionally, or alternatively, one or more of the security test sequences may include multiple security tests.

As shown in block 306, the process flow 300 may include parsing responses of the application to the security test sequences to generate results of the security test sequences. For example, a testing system and/or a test sequence generating system may parse responses of the application to the security test sequences to generate results of the security test sequence. In some embodiments, the results of the security test sequences may include whether the application passed or failed each security test of the security test sequences.

As shown in block 308, the process flow 300 may include labeling, with the fingerprint, the results. For example, a testing system and/or a test sequence generating system may label, with the fingerprint, the results.

As shown in block 310, the process flow 300 may include providing, to one or more machine learning models, the labeled results to determine probabilities of applications having a same fingerprint as the fingerprint of the application failing the security test sequences by determining, for each security test sequence, a probability of the applications failing the security test sequence. For example, a testing system and/or a test sequence generating system may provide, to one or more machine learning models, the labeled results to determine probabilities of applications having a same fingerprint as the fingerprint of the application failing the security test sequences by determining, for each security test sequence, a probability of the applications failing the security test sequence.

As shown in block 312, the process flow 300 may include updating, based on the probabilities of the applications failing the security test sequences, the order, where a first security test sequence having a highest probability of the applications failing is first in the updated order. For example, a testing system and/or a test sequence generating system may update, based on the probabilities of the applications failing the security test sequences, the order. In some embodiments, a first security test sequence having a highest probability of the applications failing is first in the updated order.

As shown in block 314, the process flow 300 may include storing, in a temporary persistent storage device and based on the updated order, the security test sequences. For example, a testing system and/or a test sequence generating system may store, in a temporary persistent storage device and based on the updated order, the security test sequences.

In some embodiments, the process flow 300 may include performing the security test sequences stored in the temporary persistent storage device on other applications in a manner similar to that described herein with respect to other portions of process flow 300. For example, the process flow 300 may include performing blocks 302-314 with respect to other applications such that the temporary persistent storage device stores security tests sequences in various orders based on fingerprints of the other applications. Furthermore, the process flow 300 may include performing blocks 302-314 with respect to other applications having a same fingerprint such that the process flow updates the order of the security test sequences stored in the temporary persistent storage device based on response of the other applications. In some embodiments, the process flow 300 may include (e.g., rather than or in addition to storing the security test sequences in an order and updating the order) associating each of the security test sequences with an index and updating the index, where the index indicates an order for performing the security test sequences on an application, and where the index is associated with a fingerprint.

Process flow 300 may include additional embodiments, such as any single embodiment or any combination of embodiments described below and/or in connection with one or more other processes described elsewhere herein.

In a first embodiment, the application is a first application, and the process flow 300 may include determining whether a second application has the same fingerprint as the fingerprint of the first application and performing, in the updated order and based on determining that the second application has the same fingerprint as the fingerprint of the first application, the security tests on the second application.

In a second embodiment alone or in combination with the first embodiment, the responses may be first responses, the results may be first results, and the process flow 300 may include parsing second responses of the second application to the security test sequences to generate second results of the security test sequences, where the second results of the security test sequences include whether the second application passed or failed each security test of the security test sequences, labeling, with the fingerprint, the second results, providing, to the one or more machine learning models, the labeled second results to determine updated probabilities of the applications having the same fingerprint failing the security test sequences by determining, for each security test sequence, an updated probability of the applications failing the security test sequence, changing, based on the updated probabilities of the applications failing the security test sequences, the updated order, where another security test sequence having a highest updated probability of the applications failing is first in the changed updated order, and storing, in the temporary persistent storage device and based on the changed updated order, the security test sequences.

In a third embodiment alone or in combination with any of the first through second embodiments, the process flow 300 may include determining temporal efficacy metrics for the security test sequences by determining, for each security test sequence, a temporal efficacy metric based on a comparison of a time period taken to perform the security test sequence and a number of times the applications, on which the security test sequence is performed, fail the security test sequence.

In a fourth embodiment alone or in combination with any of the first through third embodiments, the process flow 300 may include changing, based on the temporal efficacy metrics, the updated order.

In a fifth embodiment alone or in combination with any of the first through fourth embodiments, the order may be based on previously determined probabilities of the applications having the same fingerprint as the fingerprint of the application failing the security test sequences.

In a sixth embodiment alone or in combination with any of the first through fifth embodiments, the temporary persistent storage device may be a first temporary persistent storage device and the process flow 300 may include storing, in a second temporary persistent storage device, the results and when labeling, with the fingerprint, the results, labeling the results with the fingerprint in the second temporary persistent storage device In a seventh embodiment alone or in combination with any of the first through sixth embodiments, the second temporary persistent storage device may include other labeled results of security tests and security test sequences performed on one or more other applications, and the other parsed results may be labeled with one or more other fingerprints of the one or more other applications.

In an eighth embodiment alone or in combination with any of the first through seventh embodiments, the process flow 300 may include labeling, with the fingerprint, the probabilities and storing, in the temporary persistent storage device, the labeled probabilities.

In a ninth embodiment alone or in combination with any of the first through eighth embodiments, the security test sequences may include one or more security test sequences generated by linking a first security test to a second security test that another application failed.

In a tenth embodiment alone or in combination with any of the first through ninth embodiments, the labeled results may include the fingerprint, whether the application passed or failed each security test performed on the application, a type of each security test performed on the application, and another order in which, within each security test sequence, the security tests were performed on the application.

Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

In some embodiments, a testing system may perform testing on an application before deployment of the application and/or at a time of deploying the application, which may permit weaknesses of the application to be resolved earlier, thereby conserving financial, computer, and/or network resources consumed by weaknesses of the application. In some embodiments, the testing system may identify business logic tests, which are currently undetectable. In some embodiments, the testing system may perform automated business logic testing.

As noted above, in some embodiments, the process flow 200 and/or the process flow 300 may include performing one or more of the functions described herein using machine learning and/or a machine learning model. For example, the system may provide data from parsed responses, data from successful security tests and/or security test sequences (e.g., security tests and/or security test sequences that one or more applications failed), data from probabilities of applications failing security tests and/or security test sequences, types of security test and/or security test sequences, fingerprints of applications, an order in which security tests and/or security test sequences are performed on one or more applications, information associated with security tests and/or security test sequences, time periods spent performing security test sequences, a number of the security test sequences performed during the time periods that the application failed, and/or the like to a machine learning model trained (e.g., using historical data) to output probabilistically-ranked test sequences, test sequences grouped by fingerprints of applications, and/or the like.

In some embodiments, the system may be configured to implement any of the following applicable machine learning algorithms either singly or in combination: supervised learning (e.g., using logistic regression, using back propagation neural networks, using random forests, decision trees, and/or the like), unsupervised learning (e.g., using an Apriori algorithm, using K-means clustering), semi-supervised learning, reinforcement learning (e.g., using a Q-learning algorithm, using temporal difference learning), and any other suitable learning style. Each module of the system may implement any one or more of: a regression algorithm (e.g., ordinary least squares, logistic regression, stepwise regression, multivariate adaptive regression splines, locally estimated scatterplot smoothing, and/or the like), an instance-based method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, an LDA, and/or the like), a clustering method (e.g., k-means clustering, expectation maximization, and/or the like), an associated rule learning algorithm (e.g., an Apriori algorithm, an Eclat algorithm, and/or the like), an artificial neural network model (e.g., a Perceptron method, a back-propagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial least squares regression, Sammon mapping, multidimensional scaling, projection pursuit, and/or the like), an ensemble method (e.g., boosting, bootstrapped aggregation, AdaBoost, stacked generalization, gradient boosting machine method, random forest method, and/or the like), and any suitable form of machine learning algorithm. Each processing portion of the system may additionally or alternatively leverage a probabilistic module, heuristic module, deterministic module, or any other suitable module leveraging any other suitable computation method, machine learning method or combination thereof. However, any suitable machine learning approach may otherwise be incorporated in the system. Further, any suitable model (e.g., machine learning, non-machine learning, and/or the like) may be used in generating data relevant to the system. In some embodiments, the one or more machine learning algorithms may be predictive modeling algorithms configured to use data and statistics to predict outcomes with forecasting models.

In some embodiments, the machine learning model may be generated by training on data from parsed responses, data from successful security tests and/or security test sequences (e.g., security tests and/or security test sequences that one or more applications failed), data from probabilities of applications failing security tests and/or security test sequences, types of security test and/or security test sequences, fingerprints of applications, an order in which security tests and/or security test sequences are performed on one or more applications, information associated with security tests and/or security test sequences, time periods spent performing security test sequences, a number of the security test sequences performed during the time periods that the application failed, and/or the like over a predetermined past period of time. In doing so, the system may be configured to generate probabilistically ranked test sequences, test sequences grouped by fingerprints of applications, and/or the like. In some embodiments, the one or more machine learning algorithms may be used to calculate likelihoods of a software application passing or failing a security test and/or a security test sequence, and whether the likelihood satisfies a threshold.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for dynamically performing linked security tests, the system comprising:
   at least one non-transitory storage device comprising computer-executable code portions stored thereon; and
   at least one processing device coupled to the at least one non-transitory storage device, wherein the at least one processing device is configured to execute the computer-executable code portions to:
   determine a fingerprint of a first application;
   perform, in an initial order and based on security test protocols, first security test sequences on the first application, wherein the initial order is based on the first fingerprint of the first application, and wherein one or more of the first security test sequences comprises multiple security tests;
   parse first responses of the first application to the first security test sequences to generate results of the first security test sequences, wherein the first results of the first security test sequences comprise whether the first application passed or failed each security test of the first security test sequences;
   label, with the first fingerprint, the first results of the first application to obtain labeled first results;
   provide, to one or more machine learning models, the labeled first results to determine, for applications having the first fingerprint, first probabilities of the applications failing the first security test sequences by determining, for each given security test sequence, a probability of the applications failing the given security test sequence;
   update, based on the first probabilities of the applications failing the first security test sequences, the initial order to obtain a first updated order, wherein a first security test sequence having a highest probability of the applications failing is first in the updated order; and
   store, in a first storage device and based on the first updated order, the first security test sequences;
   determine a second fingerprint of a second application;
   determine whether the second fingerprint is the same fingerprint as the first fingerprint;
   perform, based on determining that the second fingerprint is not the same fingerprint as the first fingerprint, second security test sequences on the second application, wherein the second security test sequences are from a ranked test sequences data structure, and wherein the second security test sequences are based on the second fingerprint;
   perform, in the first updated order, based on the security test protocols, and based on determining that the second fingerprint is the same fingerprint as the first fingerprint, the first security test sequences on the second application;
   parse second responses of the second application to the security test sequences to generate second results of the first security test sequences, wherein the second results of the first security test sequences comprise whether the second application passed or failed each security test of the first security test sequences;
   label, with the second fingerprint, the second results of the second application to obtain labeled second results;
   provide, to the one or more machine learning models, the labeled second results to determine, for the applications having the first fingerprint, updated probabilities of the applications failing the security test sequences by determining, for each given security test sequence, a probability of the applications failing the given security test sequence;
   update, based on the updated probabilities of the applications failing the first security test sequences, the first updated order to obtain a second updated order, wherein a second security test sequence having a new highest probability of the applications failing is first in the second updated order; and
   store, in the first storage device and based on the second updated order, the first security test sequences.

2. The system of claim 1, wherein the at least one processing device is further configured to execute the computer-executable code portions to determine temporal efficacy metrics for the first security test sequences by determining, for each security test sequence, a temporal efficacy metric based on a comparison of a time period taken to perform the security test sequence and a number of times the applications, on which the security test sequence is performed, fail the security test sequence.

3. The system of claim 2, wherein the at least one processing device is further configured to execute the computer-executable code portions to change, after updating the initial order and based on the temporal efficacy metrics, the first updated order.

4. The system of claim 1, wherein the initial order is based on previously determined probabilities of the applications failing the first security test sequences, wherein the applications have the first fingerprint.

5. The system of claim 1, wherein the at least one processing device is further configured to execute the computer-executable code portions to:
   store, in a second storage device, the first results and the second results;
   when labeling, with the first fingerprint, the first results, label the results with the first fingerprint in the second storage device; and
   when labeling, with the second fingerprint, the second results, label the second results with the second fingerprint in the second storage device.

6. The system of claim 5, wherein the second storage device comprises other labeled results of security tests and security test sequences performed on one or more other applications, and wherein the other labeled results are labeled with one or more other fingerprints of the one or more other applications.

7. The system of claim 1, wherein the at least one processing device is further configured to execute the computer-executable code portions to:
  label, with the first fingerprint, the first probabilities to obtain labeled first probabilities; and
  store, in the storage device, the labeled first probabilities.

8. The system of claim 1, wherein the first security test sequences comprise one or more security test sequences generated by linking a first security test to a second security test that another application failed.

9. The system of claim 1, wherein the labeled first results comprise the first fingerprint, whether the application passed or failed each security test performed on the first application, a type of each security test performed on the first application, and another order in which, within each security test sequence, the security tests were performed on the first application.

10. A computer program product for dynamically performing linked security tests, the computer program product comprising a non-transitory computer-readable medium comprising code that, when executed, causing a first apparatus to:
  determine a first fingerprint of a first application;
  perform, in an initial order and based on security protocols, first security test sequences on the first application, wherein the initial order is based on the first fingerprint of the first application, and wherein one or more of the first security test sequences comprises multiple security tests;
  parse first responses of the first application to the first security test sequences to generate first results of the first security test sequences, wherein the results of the first security test sequences comprise whether the first application passed or failed each security test of the first security test sequences;
  label, with the first fingerprint, the results of the first application to obtain labeled first results;
  provide, to one or more machine learning models, the labeled results to determine, for applications having the first fingerprint, first probabilities of the applications failing the first security test sequences by determining, for each given security test sequence, a probability of the applications failing the given security test sequence;
  update, based on the probabilities of the applications failing the first security test sequences, the initial order to obtain a first updated order, wherein a first security test sequence having a highest probability of the applications failing is first in the first updated order;
  store, in a first storage device and based on the updated order, the first security test sequences;
  determine a second fingerprint of a second application;
  determine whether the second fingerprint is the same fingerprint as the first fingerprint;
  perform, based on determining that the second fingerprint is not the same fingerprint as the first fingerprint, second security test sequences on the second application, wherein the second security test sequences are from a ranked test sequences data structure, and wherein the second security test sequences are based on the second fingerprint;
  perform, in the first updated order, based on the security test protocols, and based on determining that the second fingerprint is the same fingerprint as the first fingerprint, the first security test sequences on the second application;
  parse second responses of the second application to the first security test sequences to generate second results of the first security test sequences, wherein the second results of the first security test sequences comprise whether the second application passed or failed each security test of the first security test sequences;
  label, with the second fingerprint, the second results of the second application to obtain labeled second results;
  provide, to the one or more machine learning models, the labeled second results to determine, for the applications having the first fingerprint, updated probabilities of the applications failing the first security test sequences by determining, for each given security test sequence, a probability of the applications failing the given security test sequence;
  update, based on the updated probabilities of the applications failing the first security test sequences, the first updated order to obtain a second updated order, wherein a second security test sequence having a new highest probability of the applications failing is first in the second updated order; and
  store, in the first storage device and based on the second updated order, the first security test sequences.

11. The computer program product of claim 10, wherein the non-transitory computer-readable medium further comprises code that, when executed, causes the first apparatus to determine temporal efficacy metrics for the first security test sequences by determining, for each security test sequence, a temporal efficacy metric based on a comparison of a time period taken to perform the security test sequence and a number of times the applications, on which the security test sequence is performed, fail the security test sequence.

12. The computer program product of claim 11, wherein the non-transitory computer-readable medium further comprises code that, when executed, causes the first apparatus to change, after updating the initial order and based on the temporal efficacy metrics, the updated order.

13. The computer program product of claim 10, wherein the initial order is based on previously determined probabilities of the applications failing the first security test sequences, wherein the applications have the first fingerprint.

14. The computer program product of claim 10, wherein the non-transitory computer-readable medium further comprises code that, when executed, causes the first apparatus to:
  store, in a second storage device, the first results and the second results;
  when labeling, with the first fingerprint, the first results, label the results with the first fingerprint in the second storage device; and
  when labeling, with the second fingerprint, the second results, label the second results with the second fingerprint in the second storage device.

15. The computer program product of claim 14, wherein the second storage device comprises other labeled results of security tests and security test sequences performed on one or more other applications, and wherein the other parsed results are labeled with one or more other fingerprints of the one or more other applications.

16. A method for dynamically performing linked security tests, the method comprising:
  determining a first fingerprint of a first application;

performing, in an initial order and based on security test protocols, first security test sequences on the first application, wherein the initial order is based on the first fingerprint of the first application, and wherein one or more of the security test sequences comprises multiple security tests;

parsing responses of the first application to the first security test sequences to generate results of the first security test sequences, wherein the first results of the first security test sequences comprise whether the first application passed or failed each security test of the first security test sequences;

labeling, with the first fingerprint, the first results of the first application to obtain labeled first results;

providing, to one or more machine learning models, the labeled first results to determine, for applications having the first fingerprint, first probabilities of the applications failing the first security test sequences by determining, for each given security test sequence, a probability of the applications failing the given security test sequence;

updating, based on the first probabilities of the applications failing the first security test sequences, the initial order to obtain a first updated order, wherein a first security test sequence having a highest probability of the applications failing is first in the first updated order;

storing, in a storage device and based on the updated order, the first security test sequences;

determining a second fingerprint of a second application;

determining whether the second fingerprint is the same fingerprint as the first fingerprint;

performing, based on determining that the second fingerprint is not the same fingerprint as the first fingerprint, second security test sequences on the second application, wherein the second security test sequences are from a ranked test sequences data structure, and wherein the second security test sequences are based on the second fingerprint;

performing, in the first updated order, based on the security test protocols, and based on determining that the second fingerprint is the same fingerprint as the first fingerprint, the first security test sequences on the second application;

parsing second responses of the second application to the first security test sequences to generate second results of the first security test sequences, wherein the second results of the first security test sequences comprise whether the second application passed or failed each security test of the first security test sequences;

labeling, with the second fingerprint, the second results of the second application to obtain labeled second results;

providing, to the one or more machine learning models, the labeled second results to determine, for the applications having the first fingerprint, updated probabilities of the applications failing the first security test sequences by determining, for each given security test sequence, a probability of the applications failing the given security test sequence;

updating, based on the updated probabilities of the applications failing the first security test sequences, the first updated order to obtain a second updated order, wherein a second security test sequence having a new highest probability of the applications failing is first in the second updated order; and storing, in the first storage device and based on the second updated order, the first security test sequences.

17. The method of claim 16, further comprising determining temporal efficacy metrics for the first security test sequences by determining, for each security test sequence, a temporal efficacy metric based on a comparison of a time period taken to perform the security test sequence and a number of times the applications, on which the security test sequence is performed, fail the security test sequence.

18. The method of claim 17, further comprising changing, after updating the initial order and based on the temporal efficacy metrics, the first updated order.

19. The method of claim 16, wherein the initial order is based on previously determined probabilities of the applications failing the first security test sequences, wherein the applications have the first fingerprint.

20. The method of claim 16, wherein the method further comprises:
    storing, in a second storage device, the first results and the second results;
    when labeling, with the first fingerprint, the first results, labeling the first results with the first fingerprint in the second storage device; and
    when labeling, with the second finger-print, the second results, labeling the second results with the second fingerprint in the second storage device.

* * * * *